United States Patent Office 3,437,398
Patented Apr. 8, 1969

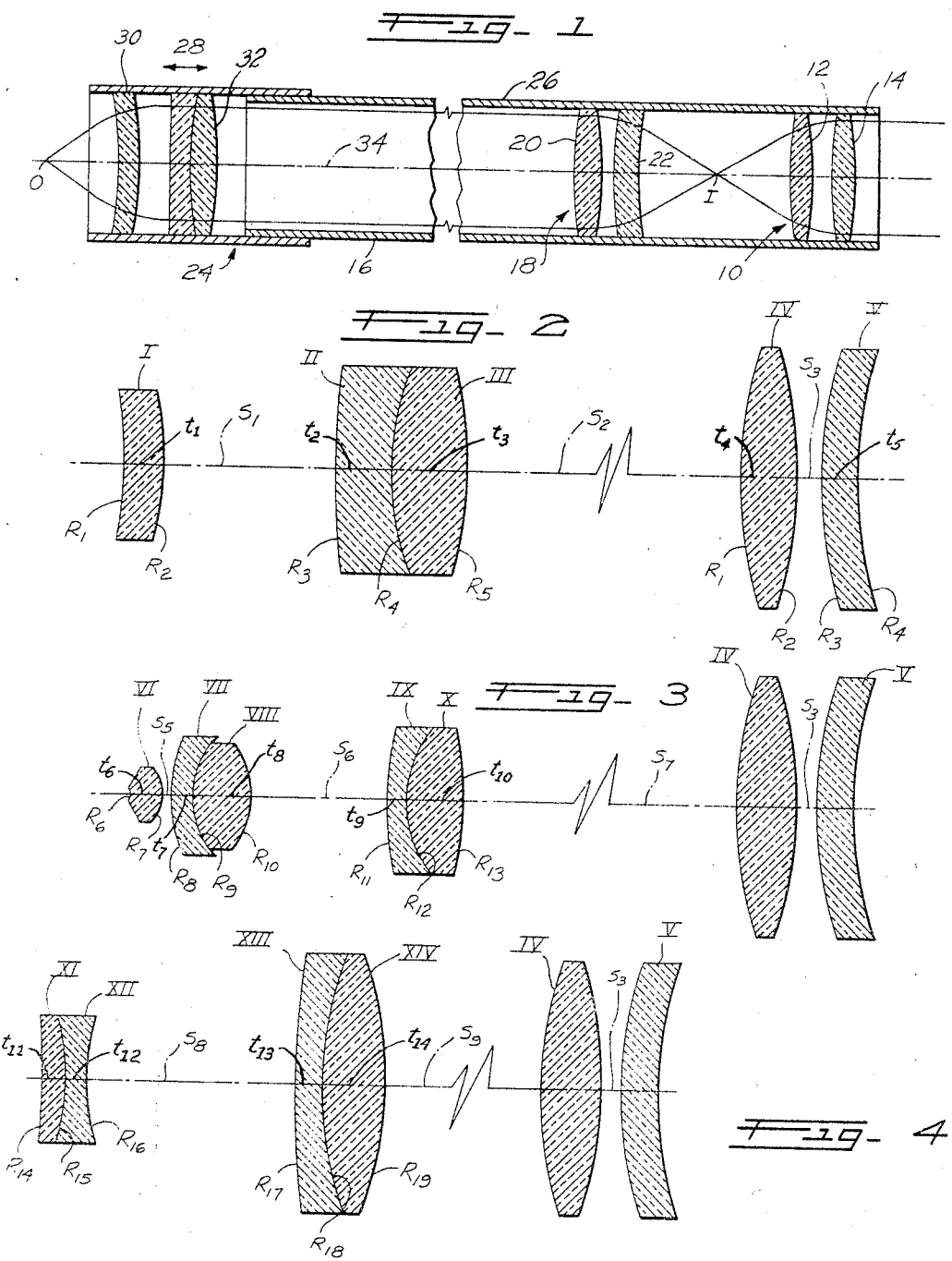

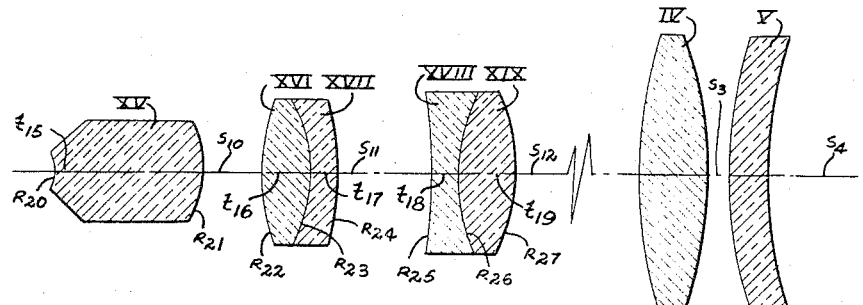
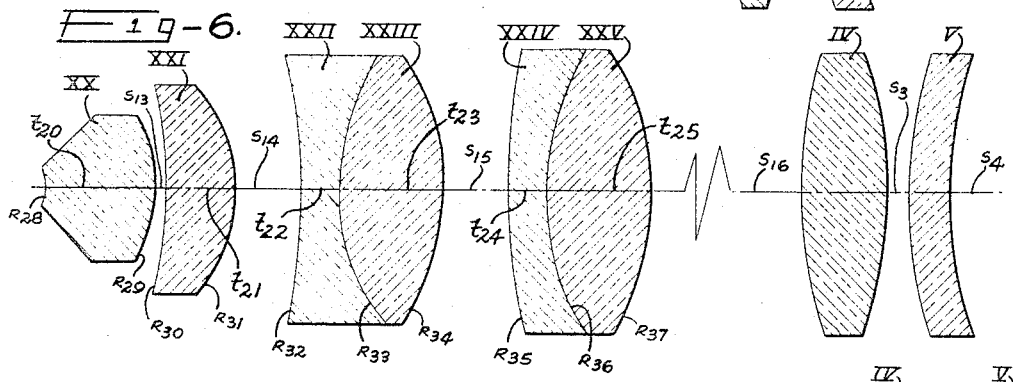
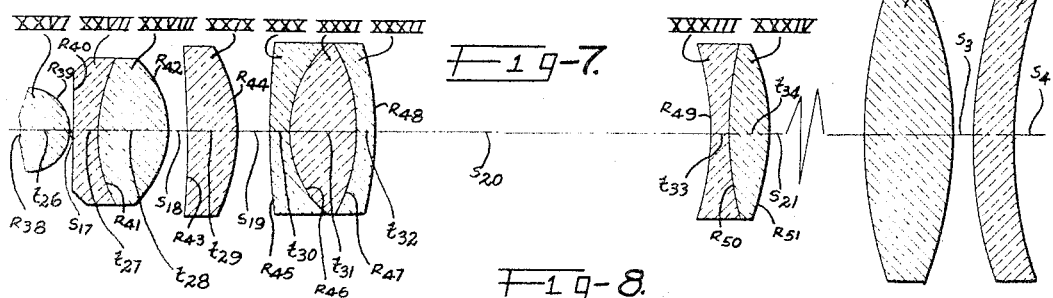
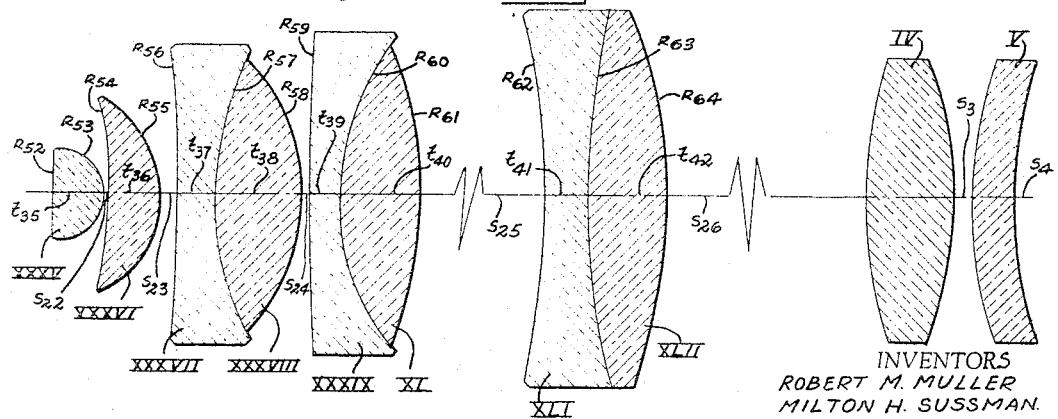

3,437,398
PLURAL MICROSCOPE OBJECTIVE USED WITH
A COMMON TELESCOPE OBJECTIVE
Robert M. Muller, Cheektowaga, and Milton H. Sussman,
Buffalo, N.Y., assignors to American Optical Corporation, Southbridge, Mass., a corporation of Delaware
Filed Feb. 10, 1964, Ser. No. 343,829
The portion of the term of the patent subsequent
to May 5, 1981, has been disclaimed
Int. Cl. G02b 7/04, 15/02, 9/00
U.S. Cl. 350—38                                    13 Claims

ABSTRACT OF THE DISCLOSURE

A telescope objective having deliberately introduced axial aberration and spaced rearwardly from any one of a series of microscope objectives is used to correct field aberrations of all of the microscope objective. The microscope objectives are characterized by a negative radius front surface reducing the Petzval sum substantially to zero, a rear doublet having deliberately introduced axial aberrations spaced rearwardly from the front lens components, or a combination of these two features to aid in substantially flattening the tangential image plane for combinations of microscope objective and the telescope objective.

---

This invention relates to optical systems for microscopes and is directed, in particular, to a microscope system employing a plurality of selectively usable objectives of different powers and/or characteristics.

In order to appreciate the objectives of this invention, it is well to bear in mind that in conventional practice, microscope objectives are well corrected for spherical aberration, coma is reduced to a minimum, and the required degree of achromatism is achieved. Following such a procedure, field curvature, astigmatism and lateral color are aberrations over which the designer has little control in any but the lower power objectives without adding to the number of components of the objective, and these aberrations are considered as inherent in "ordinary" achromatic and apochromatic objectives of medium and high power. Further, these inherent aberrations usually exist in amounts which increase with the power of the objective. The burden of removing these inherent aberrations conventionally has been placed on the eyepiece. However, although judicious selection of various eyepieces successfully may be employed to reduce lateral color to a minimum with various powers of "ordinary" objectives, field curvature and astigmatism can be reduced to a minimum only with low power objectives. Thus, with medium and high power objectives of "ordinary" type (i.e., a conventional number of components) it is conventional to tolerate substantial field curvature and astigmatism. If, on the other hand, a flat field substantially free of astigmatism is desired with medium and high power objectives, conventional practice would result in an inordinate increase in the total number of components in any system employing several objectives and, at the same time, each flat field objective of this type may require a separate eyepiece specially computed for use in conjunction therewith.

When it is realized that expense is a consideration which must be taken into account, it will be seen that a system of reasonable cost will employ "ordinary" objectives of low, medium and high powers and a single eyepiece of given power for use in conjunction with all of the objectives. With such a system, field curvature and astigmatism may be reduced to minimum for one of the low power objectives and lateral color may be optimized for one of the objectives (low or medium power unless resort is had to a special compensating eyepiece). The normal result therefore will be that significant residual lateral color, field curvature and astigmatism will exist in increasing amounts for the medium and high power objectives in combination with the one eyepiece. At additional expense, more eyepieces of the given power may be used to optimize lateral color for other objectives but in any event, significant field curvature and astigmatism will be seen to persist for the medium and high power objectives unless special flat field objectives and matching eyepieces are resorted to at still greater expense.

With the above considerations in mind, it is of principal concern in connection with this invention to provide an optical system for microscopes in which a plurality of objectives of low and medium powers present images in the focal plane of the eyepiece which are substantially flat and free from astigmatism, in which the image presented by the highest power objective appreciably and significantly is flattened, and in which each of such images also is substantially free of lateral color so that, as a result, a "balanced" system is provided which over all displays excellent optical characteristics without requiring an inordinate increase in the number of components for the system and which does not require the use of special and complex eyepieces. As a matter of fact, an eyepiece employing a doublet field lens and a single eye lens will suffice. Stated another way, this object of the invention is concerned with a system in which, for all objectives, absence or minimization of lateral color and significant field flattening is achieved with all of the objectives. The field flattening effect is so great as to produce substantially flat fields with all objectives except the objective of highest power, and even here, tremendous improvement is achieved as compared to a conventional high power objective.

In general, the optical system for microscopes according to the present invention embodies the combination of a telescope objective optically interposed between an ocular and a collimating microscope objective. In such a system for microscopes, we have found that the introduction of small amounts of axial aberrations in the telescope objective can be used to correct large amounts of inherent lateral color and tangential curvature of field in the microscope objective so that the microscope objective-telescope objective combination is well corrected for tangential curvature of field and lateral color. At the same time, the state of correction for the deliberately introduced axial aberrations of such combination can be restored, and consequently become well corrected, without significantly affecting the field aberrations, by introduction of axial aberrations in the microscope objective which are of opposite sign and substantially equal to the axial aberrations deliberately introduced in the telescope objective.

Now, whereas the present invention utilizes the general principles of our copending application, Ser. No. 114,694 filed June 5, 1961, now Patent 3,132,200, dated May 5, 1964, the present invention relates more particularly to the treatment of certain exacting requirements which are not met with in connection with an optical system as specifically disclosed in our above patent. These more exacting requirements have to do with the fact that the specific optical system according to our patent is one primarily intended for what may be termed "student" usage. In contrast to this, the present system is intended for what may be termed "medical" or professional usage. The "student" system, as the name implies, is for use by persons who are not expert micrographers and while such "student" system has excellent optical characteristics beyond those normally expected for such use, it is well known that the optical requirements for professional use which may involve both visual and photomicrographic work are very exacting, inclusive of minimization of lateral color, field curvature and astigmatism. Accordingly, it is also a broad and general object of the present invention to provide an optical system for microscopes which constitutes an improvement over the specific system according to our above patent, rendering the present system capable of the most exacting use by skilled micrographers.

To appreciate the more specific objects of this invention, it is necessary to realize that in the interests of economy and convenience, the microscope must embody a plurality of separately usable microscope objectives, all of which are well corrected. In connection with this, it has become standard to provide achromatic microscope objectives having powers in the order of 4×, 10×, 20×, 45× and 100×. Whereas it can be appreciated that the states of correction of these several microscope objectives can be enhanced by increasing the complexity of each objective, i.e. by increasing the number of lens elements of each objective, it can be appreciated also that such a solution entails considerable expense. Instead of such a solution, the present invention utilizes a telescope objective, as aforesaid, which is "balanced," so to speak, to provide image characteristics with all of the aforesaid microscope objectives which are acceptable for the medical or professional use as aforesaid, without inordinately increasing (if at all) the total number of lens elements for the entire system. That is to say, the present system accomplishes requisite image characteristics with all of the microscope objectives involved by using a total number of lens elements which is much less than would be required individually to correect the microscope objectives so as to produce comparable image characteristics. Consequently, the system according to this invention achieves excellent optical characteristics at considerably less expense than can be achieved by systems constructed according to prior art practice.

In addition to the above, the system according to the present invention permits of the construction of relatively simple objectives of low and medium powers which, in combination with the telescope objective, provide a system having a flat field with little or no astigmatism; in which the total number of lens elements for each combination of such type of microscope objective with the common telescope objective is considerably less than would be required for a microscope objective which, by itself, could produce an image approaching such flat field characteristics.

An object of this invention resides in the provision of an optical system for microscopes which may be considered as a series of objective combinations of different powers and/or characteristics; and in which each such objective combination employs a telescope objective as the rear component thereof; such telescope objective being the same entity for each of the objective combinations; and wherein the various objective combinations provide a system of improved performance, thereby minimizing the total number of components used. This fact, taken in conjunction with the improved optical characteristics of the system effects the realization of improved optical performance at reduced cost to the consumer.

Further, it is an object of this invention to permit the construction of low and intermediate or medium power microscope objective-telescope objective combinations in which the combinations yield a substantially flat Petzval surface with little or no astigmatism. Specifically, according to this invention certain achromats as well as the apochromats decribed yield, in combination with a two-element telescope objective, a Petzval sum which is substantially zero and a substantially flat tangential field to provide a flat image in the focal plane of the eyepiece which is free from astigmatic, and in which this is accomplished without resorting to the degree of complexity for any of the objectives which would normally be expected. That is, each of these specific objectives employs no more than a "normal" number of elements and whereas the telescope objective employs an additional two elements, these additional elements are far less in number than would be necessary to attain a comparable state of correction for any of the microscope objectives alone by conventional procedures. Additionally, the presence of the common telescope objective permits the construction of a high power, high N.A. objective which, in combination with the telescope objective, presents a primary image in which the field is significantly flattened without requiring the addition of an inordinate number of components.

Another object of this invention resides in the combination of a microscope objective with a telescope objective in which the microscope objective incorporates a rear doublet relatively distantly spaced from the middle components, wherein the telescope objective is relatively distantly spaced from the rear doublet and in which both the telescope objective and the rear doublet are characterized by deliberately introduced coma and/or spherical aberration which, in conjunction with the aforesaid spacings, effects substantial tangential field flattening for the combination.

Another object of this invention is to provide a combination according to the preceding object in which the microscope objective employs a front lens having a front surface of negative radius for reduction of Petzval sum.

Other objects and advantages of the invention will appear from the description hereinbelow and the accompanying drawing wherein:

FIG. 1 is a sectional view of a mechanically simplified form of microscope illustrating the principles of the present invention; and FIGS. 2–8 are views showing microscope objective-telescope objective combinations in accord with this invention.

Referring at this time more particularly to FIG. 1, the system shown therein comprises an eyepiece indicated generally by the reference character 10 which, for the purpose of clarity only since the eyepiece per se forms no part of the present invention, is shown consisting of two positive lenses 12 and 14. This eyepiece combination is rigidly mounted in the microscope tube 16. Also fixed within the tube 16 is a telescope objective indicated generally by the reference character 18 and which is constructed in accordance with the principles of this invention and will be seen to consist of a slightly separated doublet comprising the positive lens 20 and the negative lens 22. Suitably mounted on the remote end of the tube 16, that is remote from the eyepiece 10, is a microscope objective indicated generally by the reference charatcer 24. The specific manner in which this microscope objective is mounted for motion relative to the tube forms no part of the present invention and for the sake of simplicity a sliding fit btween the tube 16 and the surrounding microscope objective tube 26 is shown, so as to permit motion of the microscope objective as indicated by the arrows 28.

The microscope objective 24 in the particular instance shown in FIG. 1 incorporates a single positive lens 30 and a cemented doublet indicated generally by the reference character 32. The optical axis of the system is as designated by reference character 34 and in the position of adjustment of the microscope objective 24 the same is focused upon object at point 0 and, as can be seen by the diagrammatic tracings therefrom, this object is imaged at infinity by the microscope objective. The point I at which the object is imaged by the combination of microscope objective 24 and the telescope objective 18 lies in the focal plane of the eyepiece 10 so that the object is viewed by the eye at infinity.

By physically displacing the telescope objective 18 sufficiently far from the microscope objective whereat the aperture stop for the system is located, a small change in axial aberrations of the telescope objective will produce a relatively large change in filed aberrations of the system. At the same time, a small change in the axial aberrations in the microscope objective will produce only a small change in field aberrations of the system. Therefore, the axial aberrations introduced in the telescope objective to effect large influence on field aberrations of the microscope objectives may be restored by introducing the same axial aberrations, in substantially equal amounts and of opposite sign, in the microscope objective, with only an insignificant change in field aberration of the ssytem.

As will be specifically disclosed hereinafter, the system according to this invention embodies a single telescope objective usable in conjunction with any one of the several microscope objectives. In particular, the system of this invention includes 4×, 10×, 45× and 100× achromatic microscope objectives as well as 10×, 20× and 45× apochromatic microscope objectives, all used with a common telescope objective which employs (1) outward coma (offense against the sine condition) which tends to influence any microscope objective used therewith in the direction of overcorrection of tangential curvature of field, and (2) undercorrected axial color which tends to influence any microscope objective used therewith in the direction of undercorrection of lateral color. By undercorrected lateral color is meant that the blue image is smaller than the red image. With this combination, it is possible to construct all the objectives so that no significant lateral color exists for any combination and so that all low and medium power objectives will display substantially flat fields while the field with the 100× objective is materially and significantly flattened.

The telescope objective of the present invention is illustrated in FIG. 2 for example, in conjunction with a 10× achromat. The same telescope objective is, as set forth above, used in common with all of the microscope objectives disclosed herein but the telescope objective is so constructed as to permit all of the low and medium power microscope objectives to provide substantially flat fields, to permit the field with the 100× achromat to be significantly flattened, and to permit lateral color to be minimized with all of the objectives. The telescope objective will be seen to consist of the air separated doublet IV and V in which the optical constants thereof are as listed in the following table in which $n_D$ is the index of refraction for the D line of sodium, $v$ is the reciprocal dispersion of the optical material and all radii, thicknesses and spacings are in millimeters:

TABLE 1

| Lens | $n_D$ | $v$ | Radii | Thicknesses and Spacings |
|---|---|---|---|---|
| IV | 1.617 | 54.9 | $R_1=+105.825$ | $t_4=2.30$ |
| | | | $R_2=-161.032$ | $S_3=0.250$ |
| V | 1.511 | 63.5 | $R_3=+46.939$ | $t_5=2.30$ |
| | | | $R_4=+32.800$ | |

Equivalent focal length=182.77 mm.

Specifically, the above telescope objective is constructed to obtain undercorrected axial or longitudinal color and outward coma (offense against the sine condition), the latter being accomplished, while holding the spherical aberration zero, by bending the components IV and V.

The 10× achromat—N.A. 0.25

Since 10× achromats enjoy very wide usage, this objective, as shown in FIG. 2, will be discussed first. As shown, this objective employs a singlet front I and the doublet II, III which represents a minimum number of components for an objective of this power and N.A. (numerical aperture). It is realized, of course, that there are in effect five elements when one considers its combination with the telescope objective. However, the significant factor is that the telescope objective is not tailored to this microscope objective alone, but is fixed in its axial aberrations to obtain excellent optical performance for the system as a whole, inclusive of all the microscope objectives.

For this objective in combination with the telescope objective, the tangential image plane is very nearly flat and the astigmatism is well corrected, producing good flat field characteristics. Also, the lateral color for this objective in combination with the telescope objective is well corrected.

The data for this microscope objective is given in the following table in which the optical constants are of the same significance as in Table 1:

TABLE 2

| Lens | $n_D$ | $v$ | Radii | Thicknesses and Spacings |
|---|---|---|---|---|
| I | 1.60530 | 43.6 | $R_1=-607.600$ | $t_1=2.00$ |
| | | | $R_2=-14.370$ | $S_1=9.00$ |
| II | 1.7506 | 27.8 | $R_3=+96.300$ | $t_2=3.0$ |
| III | 1.620 | 60.3 | $R_4=+12.840$ | $t_3=3.93$ |
| | | | $R_5=-19.800$ | $S_2=89.86$ |

Equivalent focal length=18.28 mm.; N.A. 0.25.

The 45× achromat—N.A. 0.66

This objective is shown in combination with the telescope objective in FIG. 3. With this particular objective, the field flattening effect of the telescope objective is combined with significant reduction of the Petzval sum as accomplished by the negative radius $R_6$ of the front lens VI. By reducing the Petzval sum at this point, i.e. close to the object plane, other aberrations are not severely affected and the net result is that the tangential field flattening effect of the telescope objective can be used to substantial advantage, without introducing intolerable astigmatism, due to the reduced Petzval sum of the combination.

As a matter of fact, the field is flatter and with less astigmatism than is the case for the 10× acromat. Here again, the lateral color of the 45× achromat-telescope objective is well corrected although not as well as in the 10× achromat-telescope objective combination.

The data for this microscope objective is given in the following table in which the optical constants are of the same significance as in Table 1:

TABLE 3

| Lens | $n_D$ | $v$ | Radii | Thicknesses and Spacings |
|---|---|---|---|---|
| VI | 1.6968 | 56.15 | $R_6=-1.462$ | $t_6=1.65$ |
| | | | $R_7=-1.793$ | $S_5=0.150$ |
| VII | 1.7506 | 27.8 | $R_8=+8.110$ | $t_7=1.00$ |
| VIII | 1.5410 | 59.9 | $R_9=+3.910$ | $t_8=3.10$ |
| | | | $R_{10}=-4.300$ | $S_6=6.45$ |
| IX | 1.7506 | 27.8 | $R_{11}=+18.475$ | $t_9=0.95$ |
| X | 1.5410 | 47.3 | $R_{12}=+5.054$ | $t_{10}=3.23$ |
| | | | $R_{13}=-19.830$ | $S_7=82.20$ |

Equivalent focal length=4.06 mm.; N.A. 0.66.

The 4× achromat—N.A. 0.12

With this objective, as shown in FIG. 4, two doublets are used which, in combination with the telescope objective, produce a Petzval sum which is very nearly zero. Also, the tangential field flattening effect of the telescope objective is used to produce a substantially flat tangential image field. The net result is that the field, as a whole, is almost completely flat and thus displays substantially no astigmatism. Insofar as lateral color is concerned, this aberration is also well corrected, lying somewhere between the states of correction for the two previously described achromats.

The data for this microscope objective is given in the following table in which the optical constants are of the same significance as in Table 1:

TABLE 4

| Lens | $n_D$ | $\nu$ | Radii | Thicknesses and Spacings |
|---|---|---|---|---|
| XI | 1.75060 | 27.8 | $R_{14}=-93.250$ | $t_{11}=1.198$ |
| XII | 1.517 | 64.5 | $R_{15}=-11.060$ | $t_{12}=.998$ |
|  |  |  | $R_{16}=+11.940$ | $S_8=25.372$ |
| XIII | 1.78446 | 25.7 | $R_{17}=+44.270$ | $t_{13}=1.697$ |
| XIV | 1.498 | 67.0 | $R_{18}=+19.230$ | $t_{14}=3.013$ |
|  |  |  | $R_{19}=-19.230$ | $S_9=77.07$ |

Equivalent focal length=45.90 mm.; N.A. 0.12.

The 10× apochromat—N.A. 0.30

This objective is shown in FIG. 5 and will be seen to consist of a single front lens XV followed by two doublets XVI, XVII and XVIII, XIX. Such a construction represents a normal number of components for an objective of this type. As in the case with the 45× achromat, the 10× apochromat employs a negative radius $R_{20}$ to reduce the Petzval sum so that, in combination with the telescope objective, the field as a whole is substantially flat and has substantially no astigmatism. Moreover, the lateral color of this combination is zero, for all practical purposes.

The data for this microscope objective is given in the following table in which the optical constants are of the same significance as in Table 1:

TABLE 5

| Lens | $n_D$ | $\nu$ | Radii | Thicknesses and Spacings |
|---|---|---|---|---|
| XV | 1.6968 | 56.15 | $R_{20}=-4.883$ | $t_{15}=8.895$ |
|  |  |  | $R_{21}=-8.21$ | $S_{10}=7.580$ |
| XVI | 1.518 | 59.6 | $R_{22}=+41.82$ | $t_{16}=2.58$ |
| XVII | 1.613 | 44.2 | $R_{23}=-9.66$ | $t_{17}=1.6$ |
|  |  |  | $R_{24}=-36.05$ | $S_{11}=10.781$ |
| XVIII | 1.613 | 44.2 | $R_{25}=-564.8$ | $t_{18}=1.697$ |
| XIX | 1.43385 | 95.4 | $R_{26}=+17.84$ | $t_{19}=3.534$ |
|  |  |  | $R_{27}=-16.66$ | $S_{12}=79.52$ |

Equivalent focal length=18.28 mm.; N.A. 0.30.

The 20× apochromat—N.A. 0.60

This objective is shown in FIG. 6 and, as is the case with the 45× achromat and the 10× apochromat, utilizes a Petzval sum-reducing front lens XX. Here again, this objective represents a normal number of components for the power and N.A. obtained but produces flat field characteristics and absence of lateral color far beyond that which would normally be expected for an objective of this power and N.A. The field as a whole is substantially flat and some astigmatism remains owing to the fact that the tangential and sagittal image planes are substantially equally positioned on opposite sides of the paraxial image plane albeit both are very nearly flat. The lateral color of this combination is somewhat greater than for the 10× apochromat-telescope objective combination but is substantially less than for any of the achromats in combination with the telescope objective.

The data for this microscope objective is given in the following table in which the optical constants are of the same significance as in Table 1:

TABLE 6

| Lens | $n_D$ | $\nu$ | Radii | Thicknesses and Spacings |
|---|---|---|---|---|
| XX | 1.6968 | 56.2 | $R_{28}=-3.20$ | $t_{20}=4.645$ |
|  |  |  | $R_{29}=-4.624$ | $S_{13}=0.052$ |
| XXI | 1.48626 | 81.9 | $R_{30}=-22.380$ | $t_{21}=2.879$ |
|  |  |  | $R_{31}=-7.040$ | $S_{14}=4.815$ |
| XXII | 1.52935 | 51.8 | $R_{32}=-29.220$ | $t_{22}=2.268$ |
| XXIII | 1.43385 | 95.4 | $R_{33}=+18.070$ | $t_{23}=4.021$ |
|  |  |  | $R_{34}=-10.410$ | $S_{15}=1.072$ |
| XXIV | 1.6130 | 44.2 | $R_{35}=+314.8$ | $t_{24}=1.70$ |
| XXV | 1.43385 | 95.4 | $R_{36}=+14.097$ | $t_{25}=3.224$ |
|  |  |  | $R_{37}=-19.440$ | $S_{16}=92.69$ |

Equivalent focal length=9.136 mm.; N.A. 0.60.

The 45× apochromat—N.A. 0.80

This objective is shown in FIG. 7 and, as before, uses a front lens XXVI having a negative radius $R_{38}$ tending to reduce the Petzval sum. However, in order to provide a substantially flat tangential image plane, it was necessary to employ the field flattening effect of a rear doublet XXXIII, XXXIV substantially spaced from the triplet XXX, XXXI, XXXII, in which such doublet is characterized by deliberately introduced coma and/or spherical aberration in addition to the tangential field flattening effect of the telescope objective. As a result, the tangential image plane is very nearly flat and is spaced on the opposite side of the paraxial image plane from the sagittal image plane. Again, astigmatism is well corrected owing to a very low Petzval sum; astigmatism being very nearly the same as in the 45× achromat. Further, the lateral color for the combination of this objective with the telescope objective is zero.

The data for this microscope objective is given in the following table in which the optical constants are of the same significance as in Table 1:

TABLE 7

| Lens | $n_D$ | $\nu$ | Radii | Thicknesses and Spacings |
|---|---|---|---|---|
| XXVI | 1.78833 | 50.4 | $R_{38}=-1.716$ | $t_{26}=2.245$ |
|  |  |  | $R_{39}=-2.034$ | $S_{17}=.17$ |
|  |  |  | $R_{40}=-72.3$ |  |
| XXVII | 1.613 | 44.2 | $R_{41}=+7.599$ | $t_{27}=1.224$ |
| XXVIII | 1.43385 | 95.4 | $R_{42}=-4.515$ | $t_{28}=3.21$ |
|  |  |  | $R_{43}=-93.38$ | $S_{18}=.922$ |
| XXIX | 1.48626 | 81.9 | $R_{44}=-7.376$ | $t_{29}=2.556$ |
|  |  |  | $R_{45}=+143.4$ | $S_{19}=1.509$ |
| XXX | 1.5838 | 46.0 | $R_{46}=+5.17$ | $t_{30}=.807$ |
| XXXI | 1.43385 | 95.4 | $R_{47}=-7.755$ | $t_{31}=3.377$ |
| XXXII | 1.613 | 44.2 | $R_{48}=-15.570$ | $t_{32}=.822$ |
|  |  |  | $R_{49}=-12.26$ | $S_{20}=15.983$ |
| XXXIII | 1.67779 | 55.5 | $R_{50}=+16.4$ | $t_{33}=.791$ |
| XXXIV | 1.53162 | 48.9 | $R_{51}=-10.126$ | $t_{34}=2.01$ |
|  |  |  |  | $S_{21}=100.88$ |

Equivalent focal length=4.035 m.m.; N. A. 0.80.

The 100× achromat oil immersion—N.A. 1.25

This objective is shown in FIG. 8 and is similar in some respects to the 45× apochromat in that a rear doublet XLI, XLII is used, in which the doublet is characterized by deliberately introduced coma and/or spherical aberration and is spaced a substantial distance from the doublet XXXIX, XL in the middle portion of the objective, to aid the telescope objective in flattening the tangential image plane. However, since this objective is of the oil immersion type, no practical advantage would have been gained by providing a negative radius at $R_{52}$ and, as a consequence, the Petzval sum is fairly large in comparison with the Petzval sum of the other microscope objectives. However, in contrast to the usual case in which the tangential and sagittal image planes lies on that side of the Petzval surface opposite from the paraxial image plane, this objective in combination with the telescope objective places the tangential and sagittal image planes between the Petzval surface and the paraxial image plane. As a result, the flatness of the field as a whole is materially and significantly increased as compared with the usual case. Once again, lateral color for the combination is well corrected.

The data for this microscope objective is given in the following table in which the optical constants are of the same significanec as in Table 1:

TABLE 8

| Lens | $n_D$ | $v$ | Radii | Thicknesses and Spacings |
|---|---|---|---|---|
| XXXV | 1.5170 | 64.4 | $R_{52}=\infty$ | $t_{35}=.98$ |
| | | | $R_{53}=-.816$ | $S_{22}=.02$ |
| XXXVI | 1.5110 | 63.5 | $R_{54}=-8.16$ | $t_{36}=1.0$ |
| | | | $R_{55}=-2.04$ | $S_{23}=.333$ |
| XXXVII | 1.6490 | 33.8 | $R_{56}=-26.28$ | $t_{37}=.666$ |
| XXXVIII | 1.5110 | 63.5 | $R_{57}=+5.98$ | $t_{38}=1.653$ |
| | | | $R_{58}=-3.78$ | $S_{24}=.182$ |
| XXXIX | 1.720 | 29.3 | $R_{59}=+88.71$ | $t_{39}=.55$ |
| XL | 1.5110 | 63.5 | $R_{60}=+4.516$ | $t_{40}=1.55$ |
| | | | $R_{61}=-7.838$ | $S_{25}=31.417$ |
| XLI | 1.6980 | 56.15 | $R_{62}=-14.050$ | $t_{41}=.80$ |
| XLII | 1.5230 | 58.6 | $R_{63}=+15.645$ | $t_{42}=1.499$ |
| | | | $R_{64}=-9.575$ | $S_{26}=77.20$ |

Equivalent focal length=1.8 mm.; N.A. 1.25.

In addition to the above characteristics, each combination is also well corrected for coma and, in each case, the axial optical path differences (refocused) are well within the limit of 1/10 the wavelength of sodium D light. The combinations are, in each case, suitable for use with an eyepiece having a field diameter of 18.5 mm. with reference to which the following field aberration characteristics prevail. With regard to the specifically mentioned field aberrations of lateral color, tangential curvature of field and astigmatism, the following maximums prevail for any case:

(1) Lateral color at the edge of the field does not exceed about 45 microns as measured by the distance between C and F light in the focal plane of the eyepiece.

(2) Tangential curvature of field for all objectives, except 100×, in combination with the telescope objective does not exceed about .7FR at the edge of the field in the eyepiece focal plane where FR (focal range) is equal to the wavelength of sodium D light divided by the square of the numerical aperture $[(n' \sin U')^2]$ in the image space for the particular objective involved. This maximum is established by the 20× apochromat and for all other low and medium power objectives is at most less than half this maximum, being in some cases very nearly zero. For the 100× object, the tangential curvature of field, in combination with the telescope objective, is approximately −5.4FR at the edge of the field, the negative sign indicating that the curvature is toward the object.

(3) Astigmatism, which reaches a maximum in each case at the edge of the field in the eyepiece focal plane, does not exceed about 1.5FR for any case and is substantially less than this in most cases.

Even though the 100× achromat-telescope objective combination does not strictly produce a flat field, the tangential curvature of field of the combination has been reduced by a factor of about two as compared with conventional objectives of like power and N.A. This results in substantial improvement in field flatness as compared with conventional systems. In the 45× apochromat and the 100× achromat, tangential field flattening is materially enhanced by introducing coma and/or spherical aberration in the rear doublets thereof. Thus, because these doublets are spaced relatively far from the middle components of the respective objectives, the aforesaid axial aberration present in the doublets materially flattens the tangential image planes. Therefore, in the cases of these two objectives, a dual field flattening effect is utilized, one effect due to the axial aberration and spacing of the rear doublet and the other effect due to the axial aberration and spacing of the telescope objective.

It is preferred, for practical reasons, to utilize coma as the axial aberration which, in combination with the aforementioned spacings of the telescope objective and of the rear doublets of the 45× apochromat and the 100× oil immersion achromat, effects field flattening. With coma, the systems are less sensitive to centration errors which may occur during mass production. However, it is to be understood that coma, spherical aberration or a combination thereof may be used.

With the 100× achromat, the tangential field flattening is carried to a substantial amount without introducing intolerable astigmatism as made possible by the fact that the Petzval sum of this objective is of magnitude which is normal for an objective of this type while the tangential image plane has been significantly flattened by moving it from one side to the other of the Petzval surface and positioned to obtain about the same amount of positive astigmatism as there would be of negative astigmatism for a conventional objective of this power and N.A.

In the above microscope objectives, it will be understood that each is also characterized by the deliberate introduction of axial color and coma of amounts substantially equal to but of opposite sign to these corresponding axial aberrations which were introduced in the telescope objective. In this way, axial color and coma are substantially eliminated in each telescope objective-microscope objective combination.

From the above, it will be appreciated that the system as a whole relates to improvements in flatness of field, astigmatism and lateral color. Moreover, these effects are produced without resorting to the inordinately complex objectives which are conventionally considered necessary to produce a flat field as aforesaid. That is to say, although a few flat field achromats and apochromats are available, the number of elements used and the types of optical materials usually required classify these objectives both as complex and expensive. Thus, a certain amount of field curvature and astigmatism must be tolerated in ordinary or "normal" achromats and apochromats of medium and high power. With low powers, this can be reduced somewhat by a suitable choice of eyepieces and, in some cases, specially computed projection eyepieces can be obtained which effect considerable flattening over a very small field of view; such latter systems being satisfactory for photomicrography but being useless for visual work. The conventional alternative to special eyepieces, as above, lies in the introduction of a formidable degree of complexity in the microscope objective, as mentioned before. Thus, the present system, which employs microscope objectives of only ordinary or "normal" complexity (and in some cases less than ordinary complexity), represents a material advance in the art.

In the present system, particular reference is had to the 4×, 10× and 45× achromats as well as the 10×, 20× and 45× apochromats. All of these microscope objectives, in combination with the telescope objective, produce a substantially flat primary image with little or no astigmatism. The 100× achromat cannot be considered as producing a flat field with the telescope objective. However, material improvement has been effected in comparison with ordinary objectives of this type. That is to say, since the tangential image plane has been crossed over the Petzval surface, as compared with conventional systems, the flatness of field of this 100× objective combination has been greatly increased.

We claim:

1. In an optical system for microscopes, in combination,
a plurality of separately usable microscope objectives of various different powers, each being afflicted with inherent tangential curvature of field and each being of collimating type,
a telescope objective spaced rearwardly from each microscope objective when in use,
and an eyepiece spaced rearwardly from said telescope objective,
said telescope objective being characterized by deliberately introduced axial aberration such as coma which is of an amount sufficient to cooperate with said spacing between the telescope objective and the microscope objective to produce substantially flat tangential curvature of field in combination with each of said microscope objectives,
each of said microscope objectives being characterized by a first lens element having a negative front surface to provide a Petzval sum for each microscope objective which is substantially zero so that a substantially flat field free of astigmatism is obtained by the combination of said telescope objective with each of said microscope objectives,
each of said microscope objectives being further characterized by deliberately introduced axial aberration of the same kind as, amount substantially equal to and opposite sign to said axial aberration deliberately introduced in the telescope objective.

2. In an optical system for microscopes, in combination,
a microscope objective and a telescope objective disposed in optical alignment,
said microscope objective comprising a single front lens, middle lens components and a rear lens assembly spaced from the middle lens components,
said telescope objective and said rear lens assembly of the microscope objective being both characterized by deliberately introduced coma and the spacings between the said rear lens assembly and the telescope objective and between said rear lens assembly and said middle lens components of the microscope objective being sufficiently large to produce, in association with the deliberately introduced coma as aforesaid, substantial flattening of the tangential image plane for the microscope objective-telescope objective combination,
the front lens and middle lens components of the microscope objective being characterized by deliberately introduced coma substantially equal to and of sign opposite to the coma deliberately introduced in said rear lens and said telescope objective.

3. The system according to claim 2 wherein the tangential image plane is substantially flat and said front lens is provided with a negative radius first surface sufficient to reduce the Petzval sum of the microscope of objective-telescope objective combination substantially to zero.

4. In an optical system for microscopes, the combination of a telescope objective and a microscope objective optically aligned therewith, in which said telescope objective is spaced rearwardly from said microscope objective and the data for the objectives are as follows in which $n_D$ is the index of refraction for the D line of sodium, $v$ is the reciprocal dispersion, and all radii, thicknesses and distances are in millimeters:

*Telescope objective*

| Lens | $n_D$ | $v$ | Radii | Thicknesses and Spacings |
|---|---|---|---|---|
| IV | 1.617 | 54.9 | $R_1=+105.825$ | $t_4=2.30$ |
|  |  |  | $R_2=-161.032$ | $S_4=0.250$ |
| V | 1.511 | 63.5 | $R_3=+46.939$ | $t_5=2.30$ |
|  |  |  | $R_4=+32.800$ |  |

*4× achromat*

| Lens | $n_D$ | $v$ | Radii | Thicknesses and Spacings |
|---|---|---|---|---|
| XI | 1.75060 | 27.8 | $R_{14}=-93.250$ | $t_{11}=1.198$ |
| XII | 1.517 | 64.5 | $R_{15}=-11.060$ | $t_{12}=.998$ |
|  |  |  | $R_{16}=+11.940$ | $S_8=25.372$ |
| XIII | 1.78446 | 25.7 | $R_{17}=+44.270$ | $t_{13}=1.697$ |
| XIV | 1.498 | 67.0 | $R_{18}=+19.230$ | $t_{14}=3.013$ |
|  |  |  | $R_{19}=-19.230$ | $S_9=77.07$ |

5. In an optical system for microscopes, the combination of a telescope objective and a microscope objective optically aligned therewith, in which said telescope objective is spaced rearwardly from said microscope objective and the data for the objectives are as follows in which $n_D$ is the index of refraction for the D line of sodium, $v$ is the reciprocal dispersion, and all radii, thicknesses and distances are in millimeters:

*Telescope objective*

| Lens | $n_D$ | $v$ | Radii | Thicknesses and Spacings |
|---|---|---|---|---|
| IV | 1.617 | 54.9 | $R_1=+105.825$ | $t_4=2.30$ |
|  |  |  | $R_2=-161.032$ | $S_4=0.250$ |
| V | 1.511 | 63.5 | $R_3=+46.939$ | $t_5=2.30$ |
|  |  |  | $R_4=+32.800$ |  |

*10× achromat*

| Lens | $n_D$ | $v$ | Radii | Thicknesses and Spacings |
|---|---|---|---|---|
| I | 1.60530 | 43.6 | $R_1=-607.600$ | $t_1=2.00$ |
|  |  |  | $R_2=-14.370$ | $S_1=9.00$ |
| II | 1.7506 | 27.8 | $R_3=+96.300$ | $t_2=3.0$ |
| III | 1.620 | 60.3 | $R_4=+12.840$ | $t_3=3.93$ |
|  |  |  | $R_5=-19.800$ | $S_2=89.86$ |

6. In an optical system for microscopes, the combination of a telescope objective and a microscope objective optically aligned therewith, in which said telescope objective is spaced rearwardly from said microscope objective and the data for the objectives are as follows in which $n_D$ is the index of refraction for the D line of sodium, $v$ is the reciprocal dispersion, and all radii, thicknesses and distances are in millimeters:

*Telescope objective*

| Lens | $n_D$ | $v$ | Radii | Thicknesses and Spacings |
|---|---|---|---|---|
| IV | 1.617 | 54.9 | $R_1=+105.825$ | $t_4=2.30$ |
|  |  |  | $R_2=-161.032$ | $S_3=0.250$ |
| V | 1.511 | 63.5 | $R_3=+46.939$ | $t_5=2.30$ |
|  |  |  | $R_4=+32.800$ |  |

*10× apochromat*

| Lens | $n_D$ | $v$ | Radii | Thicknesses and Spacings |
|---|---|---|---|---|
| XV | 1.6968 | 56.15 | $R_{20}=-4.883$ | $t_{15}=8.895$ |
|  |  |  | $R_{21}=-8.21$ | $S_{10}=7.580$ |
| XVI | 1.518 | 59.6 | $R_{22}=+41.82$ | $t_{16}=2.58$ |
| XVII | 1.613 | 44.2 | $R_{23}=-9.66$ | $t_{17}=1.6$ |
|  |  |  | $R_{24}=-36.05$ | $S_{11}=10.781$ |
| XVIII | 1.613 | 44.2 | $R_{25}=-564.8$ | $t_{18}=1.697$ |
|  |  |  | $R_{26}=+17.84$ | $t_{19}=3.534$ |
| XIX | 1.43385 | 95.4 | $R_{27}=-16.66$ | $S_{12}=79.52$ |

7. In an optical system for microscopes, the combination of a telescope objective and a microscope objective optically aligned therewith, in which said telescope objective is spaced rearwardly from said microscope objective and the data for the objectives are as follows in which $n_D$ is the index of refraction for the D line of sodium, $v$ is the reciprocal dispersion, and all radii, thicknesses and distances are in millimeters:

*Telescope objective*

| Lens | $n_D$ | $v$ | Radii | Thicknesses and Spacings |
|---|---|---|---|---|
| IV | 1.617 | 54.9 | $R_1=+105.825$ | $t_4=2.30$ |
|  |  |  | $R_2=-161.032$ | $S_3=0.250$ |
| V | 1.511 | 63.5 | $R_3=+46.939$ | $t_5=2.30$ |
|  |  |  | $R_4=+32.800$ |  |

*20× apochromat*

| Lens | $n_D$ | $v$ | Radii | Thicknesses and Spacings |
|---|---|---|---|---|
| XX | 1.6968 | 56.2 | $R_{28}=-3.20$ | $t_{20}=4.645$ |
|  |  |  | $R_{29}=-4.624$ | $S_{13}=0.052$ |
| XXI | 1.48626 | 81.9 | $R_{30}=-22.380$ | $t_{21}=2.879$ |
|  |  |  | $R_{31}=-7.040$ | $S_{14}=4.815$ |
| XXII | 1.52935 | 51.8 | $R_{32}=-29.220$ | $t_{22}=2.268$ |
| XXIII | 1.43385 | 95.4 | $R_{33}=+18.070$ | $t_{23}=4.021$ |
|  |  |  | $R_{34}=-10.410$ | $S_{15}=1.072$ |
| XXIV | 1.6130 | 44.2 | $R_{35}=+314.8$ | $t_{24}=1.70$ |
|  |  |  | $R_{36}=+14.097$ | $t_{25}=3.224$ |
| XXV | 1.43385 | 95.4 | $R_{37}=-19.440$ | $S_{16}=92.69$ |

8. In an optical system for microscopes, the combination of a telescope objective and a microscope objective optically aligned therewith, in which said telescope objective is spaced rearwardly from said microscope objective and the data for the objectives are as follows in which $n_D$ is the index of refraction for the D line of sodium, $v$ is the reciprocal dispersion, and all radii, thicknesses and distances are in millimeters:

*Telescope objective*

| Lens | $n_D$ | $v$ | Radii | Thicknesses and Spacings |
|---|---|---|---|---|
| IV | 1.617 | 54.9 | $R_1=+105.825$ | $t_4=2.30$ |
|  |  |  | $R_2=-161.032$ | $S_3=0.250$ |
| V | 1.511 | 63.5 | $R_3=+46.939$ | $t_5=2.30$ |
|  |  |  | $R_4=+32.800$ |  |

*45× achromat*

| Lens | $n_D$ | $v$ | Radii | Thicknesses and Spacings |
|---|---|---|---|---|
| VI | 1.6968 | 56.15 | $R_6=-1.462$ | $t_6=1.65$ |
|  |  |  | $R_7=-1.793$ | $S_5=0.150$ |
| VII | 1.7506 | 27.8 | $R_8=+8.110$ | $t_7=1.00$ |
|  |  |  | $R_9=+3.910$ |  |
| VIII | 1.5410 | 59.9 |  | $t_8=3.10$ |
|  |  |  | $R_{10}=-4.300$ | $S_6=6.45$ |
|  |  |  | $R_{11}=+18.475$ | $t_9=0.95$ |
| IX | 1.7506 | 27.8 | $R_{12}=+5.054$ | $t_{10}=3.23$ |
| X | 1.5410 | 47.3 | $R_{13}=-19.830$ | $S_7=82.20$ |

9. In an optical system for microscopes, the combination of a telescope objective and a microscope objective optically aligned therewith, in which said telescope objective is spaced rearwardly from said microscope objective and the data for the objectives are as follows in which $n_D$ is the index of refraction for the D line of sodium, $v$ is the reciprocal dispersion, and all radii, thicknesses and distances are in millimeters:

*Telescope objective*

| Lens | $n_D$ | $v$ | Radii | Thicknesses and Spacings |
|---|---|---|---|---|
| IV | 1.617 | 54.9 | $R_1=+105.825$ | $t_4=2.30$ |
|  |  |  | $R_2=-161.032$ | $S_3=0.250$ |
| V | 1.511 | 63.5 | $R_3=+46.939$ | $t_5=2.30$ |
|  |  |  | $R_4=+32.800$ |  |

45× apochromat

| Lens | $n_D$ | $v$ | Radii | Thicknesses and Spacings |
|---|---|---|---|---|
| XXVI | 1.78833 | 50.4 | $R_{38}=-1.716$ $R_{39}=-2.034$ | $t_{26}=2.245$ $S_{17}=.17$ |
| XXVII | 1.613 | 44.2 | $R_{40}=-72.3$ $R_{41}=+7.599$ | $t_{27}=1.224$ $t_{28}=3.21$ |
| XXVIII | 1.43385 | 95.4 | $R_{42}=-4.515$ | $S_{18}=.922$ |
| XXIX | 1.48626 | 81.9 | $R_{43}=-93.38$ $R_{44}=-7.376$ | $t_{29}=2.556$ $S_{19}=1.509$ |
| XXX | 1.5838 | 46.0 | $R_{45}=+143.4$ $R_{46}=+5.17$ | $t_{30}=.807$ $t_{31}=3.377$ |
| XXXI | 1.43385 | 95.4 | $R_{47}=-7.755$ | $t_{32}=.822$ |
| XXXII | 1.613 | 44.2 | $R_{48}=-15.570$ | $S_{20}=15.983$ |
| XXXIII | 1.67779 | 55.5 | $R_{49}=-12.26$ $R_{50}=+16.4$ | $t_{33}=.791$ $t_{34}=2.01$ |
| XXXIV | 1.53162 | 48.9 | $R_{51}=-10.126$ | $S_{21}=100.88$ |

10. In an optical system for microscopes, the combination of a telescope objective and a microscope objective optically aligned therewith, in which said telescope objective is spaced rearwardly from said microscope objective and the data for the objectives are as follows in which $n_D$ is the index of refraction for the D line of sodium, $v$ is the reciprocal dispersion, and all radii, thicknesses and distances are in millimeters:

Telescope objective

| Lens | $n_D$ | $v$ | Radii | Thicknesses and Spacings |
|---|---|---|---|---|
| IV | 1.617 | 54.9 | $R_1=+105.825$ $R_2=-161.032$ | $t_4=2.30$ $S_1=0.250$ |
| V | 1.511 | 63.5 | $R_3=+46.939$ $R_4=+32.800$ | $t_5=2.30$ |

100× achromat

| Lens | $n_D$ | $v$ | Radii | Thicknesses and Spacings |
|---|---|---|---|---|
| XXXV | 1.5170 | 64.4 | $R_{52}=\infty$ $R_{53}=-.816$ | $t_{35}=.98$ $S_{22}=.02$ |
| XXXVI | 1.5110 | 63.5 | $R_{54}=-8.16$ $R_{55}=-2.04$ | $t_{36}=1.0$ $S_{23}=.333$ |
| XXXVII | 1.6490 | 33.8 | $R_{56}=-26.28$ $R_{57}=+5.98$ | $t_{37}=.666$ |
| XXXVIII | 1.5110 | 63.5 | $R_{58}=-3.78$ | $t_{38}=1.653$ $S_{24}=.182$ |
| XXXIX | 1.720 | 29.3 | $R_{59}=+88.71$ $R_{60}=+4.516$ | $t_{39}=.55$ |
| XL | 1.5110 | 63.5 | $R_{61}=-7.838$ | $t_{40}=1.55$ $S_{25}=31.417$ |
| XLI | 1.6980 | 56.15 | $R_{62}=-14.050$ $R_{63}=+15.645$ | $t_{41}=.80$ |
| XLII | 1.5230 | 58.6 | $R_{64}=-9.575$ | $t_{42}=1.499$ $S_{26}=77.20$ |

11. In an optical system for microscopes, in combination,
a telescope objective,
a first microscope objective spaced in front of said telescope objective,
said first microscope objective being afflicted with inherent undercorrection of tangential curvature of field but being otherwise well corrected monochromatically,
said telescope objective being characterized by deliberately introduced outward coma of sufficient amount to produce, with the aforesaid spacing between the microscope objective and telescope objective, substantially zero tangential curvature of field in the telescope objective-first microscope objective combination,
a second microscope objective which may be positioned in place of the first mentioned microscope objective but which is of higher power than such first microscope objective,
said second microscope objective being afflicted with tangential curvature of field and with lateral color,
the aforesaid outward coma of the telescope objective being also of such amount as to produce substantially zero tangential curvature of field in the telescope objective-second microscope objective combination,
said telescope objective being also characterized by deliberately introduced axial color of amount sufficient to maintain, with the aforesaid spacing between the microscope objective and telescope objective, the lateral color contributions of the first and second microscope objective-telescope objective combinations within standard limits of tolerance,
and both of said microscope objectives being further characterized by deliberately introduced axial color and coma in amounts substantially equal to but of opposite sign to the corresponding aberrations of the telescope objective, said telescope objective being constructed according to the following data wherein $n_D$ is the index of refraction for the D line of sodium, $v$ is the reciprocal dispersion of the optical material, and all linear dimensions are in millimeters:

| Lens | $n_D$ | $v$ | Radii | Thicknesses and Spacings |
|---|---|---|---|---|
| IV | 1.617 | 54.9 | $R_1=+105.825$ $R_2=-161.032$ | $t_4=2.30$ $S_1=0.250$ |
| V | 1.511 | 63.5 | $R_3=+46.939$ $R_4=+32.800$ | $t_5=2.30$ | and wherein the first and second microscope objectives are 10× and 45× respectively and are constructed according to the following in which the data is of the same nature as above specified:

10×

| Lens | $n_D$ | $v$ | Radii | Thicknesses and Spacings |
|---|---|---|---|---|
| I | 1.60530 | 43.6 | $R_1=-607.600$ $R_2=-14.370$ | $t_1=2.00$ $S_1=9.00$ |
| II | 1.7506 | 27.8 | $R_3=+96.300$ $R_4=+12.840$ | $t_2=3.0$ |
| III | 1.620 | 60.3 | $R_5=-19.800$ | $t_3=3.93$ |

45×

| Lens | $n_D$ | $v$ | Radii | Thicknesses and Spacings |
|---|---|---|---|---|
| VI | 1.6968 | 56.15 | $R_6=-1.462$ | $t_6=1.65$ |
|  |  |  | $R_7=-1.793$ |  |
|  |  |  |  | $S_3=0.150$ |
| VII | 1.7506 | 27.8 | $R_8=+8.110$ | $t_7=1.00$ |
| VIII | 1.5410 | 59.9 | $R_9=+3.910$ | $t_8=3.10$ |
|  |  |  | $R_{10}=-4.300$ |  |
|  |  |  |  | $S_4=6.45$ |
| IX | 1.7506 | 27.8 | $R_{11}=+18.475$ | $t_9=0.95$ |
| X | 1.5410 | 47.3 | $R_{12}=+5.054$ | $t_{10}=3.23$ |
|  |  |  | $R_{13}=-19.830$ |  |

12. In an optical system for microscopes, in combination,
a plurality of separately usable microscope objectives including objectives of low, medium and high powers, and a common telescope objective for forming an image in the focal plane of an associated eyepiece in conjunction with each of said microscope objectives,
said telescope objective being characterized by deliberately introduced axial color and outward coma in the absence of spherical aberration and each microscope objective being characterized by deliberately introduced axial color and coma of amounts and sign to substantially cancel these axial aberrations for each combination of microscope objective-telescope objective,
the telescope objective being distantly spaced from each microscope objective used therewith by an amount sufficient to (1) produce a substantially flat field substantially free from astigmatism in the focal plane of an associated eyepiece for combinations of the telescope objective with the low and medium power objectives and (2) produce an image substantially free of lateral color in the focal plane of an associated eyepiece for combinations of the telescope objective with each of the objectives,
and said high power objective including a rear doublet characterized by the deliberate introduction of axial aberration such as coma, spherical aberration, and the combination of coma and spherical aberration and being spaced from the remainder of the components of this objective by an amount sufficiently large to substantially flatten the tangential image plane of this objective, and the front part of the high power objective being characterized by axial aberration of the same kind, substantially equal amount and opposite sign to that introduced in the rear doublet thereof.

13. The system according to claim 12 wherein said high power objective also includes a front lens having a steeply inclined negative first surface and a less steeply inclined negative second surface.

References Cited

UNITED STATES PATENTS

| 2,237,943 | 4/1941 | Lihotzky | 88—39 |
| 2,518,240 | 8/1950 | Lowber et al. | 88—39 |
| 2,518,252 | 8/1950 | Reardon et al. | 88—39 |
| 3,118,964 | 1/1964 | Buzawa | 88—57 |
| 3,132,200 | 5/1964 | Muller et al. | 350—45 |

JOHN K. CORBIN, *Primary Examiner.*

U.S. Cl. X.R.

350—183, 214, 216, 215, 220, 225, 230, 232